United States Patent [19]
Stone et al.

[11] Patent Number: 5,999,370
[45] Date of Patent: Dec. 7, 1999

[54] AIRFLOW GENERATOR SPINDLE HUB FOR AERODYNAMICALLY RELEASED SHIPPING LATCH FOR DISK DRIVE ACTUATOR

[75] Inventors: Thomas R. Stone, San Francisco; David W. Foster, Los Altos, both of Calif.

[73] Assignee: Quantum Corporation, Milpitas, Calif.

[21] Appl. No.: 07/839,870

[22] Filed: Feb. 21, 1992

[51] Int. Cl.⁶ ........................................ G11B 5/54
[52] U.S. Cl. ............................................. 360/105
[58] Field of Search ............ 360/105, 75, 97.01, 360/97.02, 97.03, 86

[56] References Cited

U.S. PATENT DOCUMENTS

| | | | |
|---|---|---|---|
| 4,054,931 | 10/1977 | Bolton et al. | 360/97 |
| 4,101,945 | 7/1978 | Butsch | 360/102 |
| 4,216,512 | 8/1980 | Vidwans | 360/133 |
| 4,280,155 | 7/1981 | Scott et al. | 360/97.03 |
| 4,282,554 | 8/1981 | Ho et al. | 360/97.02 |
| 4,471,395 | 9/1984 | Beck et al. | 360/98 |
| 4,538,193 | 8/1985 | Dimmick et al. | 360/137 |
| 4,647,997 | 3/1987 | Westwood | 360/105 |
| 4,692,829 | 9/1987 | Campbell | 360/105 |
| 5,036,416 | 7/1991 | Mastache | 360/105 |
| 5,043,834 | 8/1991 | Kubo et al. | 360/105 |
| 5,124,867 | 6/1992 | Kitahori et al. | 360/105 |

OTHER PUBLICATIONS

E. Lennemann, "Aerodynamic Aspects of Disk Files" *IBM J. Research & Develop.* Nov. 1974 pp. 480–488.

Data Sheet, Model WDA–L42/WDS–L42, "3 1/2 Inch Winchester Drive Series" IBM storage Systems Products Division Oct. 1991.

"Airflow System for Disk drive", IBM Tech. Disc. Bulletin, vol. 29, No. 3, Aug. 1986, pp. 1258–1261.

*Primary Examiner*—Stuart S. Levy
*Assistant Examiner*—B E Miller
*Attorney, Agent, or Firm*—David B. Harrison; John C. Chen

[57] ABSTRACT

An aerodynamically powered release latch mechanism is provided for a fixed disk drive. A disk clamp for clamping a single data storage disk to a spindle hub comprises a centrifugal airflow pumping structure, such as radially and axially extending, generally L-shaped turboblades, for increasing the level of a vane deflecting airflow as the disk rotates. The vane deflecting airflow releases an aerodynamically released actuator latch mechanism.

6 Claims, 2 Drawing Sheets

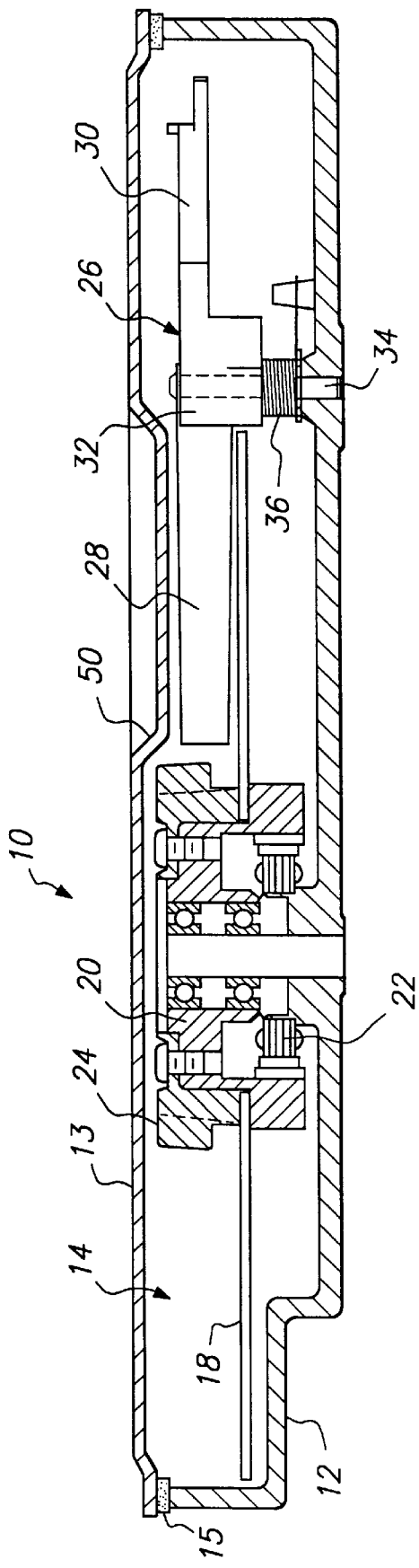
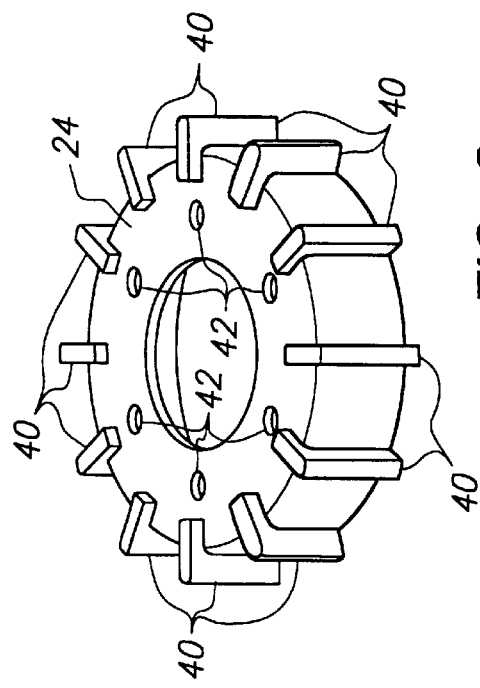
FIG. 2
FIG. 3

AIRFLOW GENERATOR SPINDLE HUB FOR AERODYNAMICALLY RELEASED SHIPPING LATCH FOR DISK DRIVE ACTUATOR

FIELD OF THE INVENTION

The present invention relates to shipping latches for disk drive actuators. More particularly, the present invention relates to an airflow generator spindle hub for an aerodynamically released shipping latch for a disk drive actuator.

BACKGROUND OF THE INVENTION

Airflow is generated incident to the rotation of data storage disks of a disk file. The characteristics of this airflow have been analyzed and reported by E. Lennemann in the *IBM Journal of Research and Development*, November 1974, pages 480–488. The amount of airflow is known to be a function of disk diameter and angular velocity. The airflow force is greatest adjacent the surface of the rotating disk and falls off rapidly as one moves away from the disk surface. It is also known that multiple commonly mounted, spaced apart rotating disks generate a significantly greater useful airflow than is generated by a single rotating disk. This is because the air between any pair of the disks is effectively trapped, and moves with a velocity comparable to that of the rotating disks themselves.

The assignee of the present invention has pioneered the development and use of a disk drive actuator lock mechanism which employs useful airflow generated by disk rotation to overcome a spring bias force and thereupon release an actuator latch and the actuator when the disks have reached an angular velocity at which the transducer sliders "fly" upon an air bearing cushion. The aerodynamically released actuator latch is described in commonly assigned U.S. Pat. No. 4,538,193 to Dimmick et al., entitled "Aerodynamically Released Safety Latch for Data Transducer Assembly in Rotating Rigid Disk Data Storage Device"; commonly assigned U.S. Pat. No. 4,692,829 to Campbell, entitled "Magnetically Biased Aerodynamically Released Integral Safety Latch for Rigid Disk Drive"; and commonly assigned U.S. Pat. No. 4,647,997 to Westwood, entitled "Aerodynamic Latch for Disk File Actuator". The disclosures of these patents are incorporated herein by reference.

Recognizing the limitations and drawbacks attending limited airflow of a small diameter (3.5") single data storage disk, the latter referenced inventor Westwood innovated the provision of an airflow generator "dummy" disk which was commonly mounted to a spindle hub in spaced-apart relation with the data storage disk. During rotation of the spindle hub, sufficient useful airflow is generated between the disks to deflect the pivoted, spring biased air vane disposed therebetween. One drawback of Westwood's airflow generator disk solution was the added cost associated with the airflow disk, an added cost amounting to about a dollar in mass production. The rigid disk drive business is now so competitive, especially at the lower capacity/price points, that unessential added costs, such as the incremental costs associated with the airflow generator disk, are no longer acceptable. Another disadvantage of the airflow disk solution was that, as the airflow disk was a thin, flat structural part with relatively large area, it proved difficult to mold from low-cost thermoplastic material without warpage or distortion. Yet another disadvantage of the airflow disk solution was that the additional vertical space the disk occupied added to the overall height (thickness) dimension of the disk drive head and disk assembly, by as much as 2–3 millimeters, or more. Since rigid disk drives are increasingly used in portable and lap top computers, it is desirable to make the disk drives as thin, compact and light in weight as possible.

IBM has proposed a disk drive product, Model WDA-L42/WDS-L42, employing a single data storage disk for generating airflow for operating an aerodynamically released actuator latch. The IBM approach is not without its drawbacks. When the amount of available useful airflow is reduced from a two-disk airflow arrangement to a single-disk airflow arrangement, there must be a corresponding reduction in spring bias force applied to the aerodynamic latch to bias it to a latched position for holding the actuator in a head parking position whenever the disk is not rotating. When the spring bias force is reduced so as to be overcome by a reduced force generated by reduced useful airflow, the latching mechanism becomes sluggish and less reliable in releasing the actuator latch in intended fashion.

It is known to enhance the level of air flowing as a consequence of rotation of a fixed data storage disk. One known reason for increasing airflow is to provide an adequate air cushion or bearing for the data transducer as it flies by the rotating disk. Another reason is to provide a cooling fluid for cooling an in-hub DC brushless spindle motor. An example of a disk drive employing a turbopump technique to enhance air flow is given in U.S. Pat. No. 4,101,945 to Butsch entitled: "rive Spindle Assembly for Disc File". In that approach, the turbopump is formed as an integral part of the disk hub, and not as a part of the disk clamp which secures the disk to the hub. The use of the increased airflow was not for the purpose of releasing an actuator latch.

Thus, a hitherto unsolved need has arisen for a method and apparatus for enhancing the level of airflow within a single disk data storage device for operating an aerodynamically released actuator latch mechanism.

SUMMARY OF THE INVENTION WITH OBJECTS

A general object of the present invention is to provide an improved low cost aerodynamically released actuator latch mechanism which overcomes limitations and drawbacks of the prior art.

Another object of the present invention is to provide a turboblade disk clamp for a disk drive which generates an equivalent airflow incident to disk rotation for releasing an actuator latch as has heretofore been provided by an additional airflow generator disk otherwise required for proper operation of a robust actuator latch in a small disk drive form factor, e.g. 3.5" or below.

A further object of the present invention is to provide an actuator latch in a height-reduced single disk data storage device at very low cost.

In accordance with principles of the present invention, an aerodynamically powered release latch mechanism is provided for a fixed disk drive. The drive includes a housing and a cover for providing an enclosed interior space, a single data storage disk in the space secured by a disk clamp to a spindle hub journalled for rotation relative to the housing by a direct drive DO brushless spindle motor, and a transducer actuator assembly in the space for supporting and positioning data read/write transducer heads in close proximity to concentric data tracks defined on major storage surfaces of the disk. The latch mechanism includes a latch in the space which is journalled for rotation relative to the housing and has an axis of rotation spaced a predetermined distance away from the periphery of the data storage disk. The latch includes an airvane portion moveably disposed in close proximity to one of the data storage surfaces of the disk as to be deflected by airflow generated during rotation of the disk, and further includes a releasable engagement member for engaging the transducer actuator assembly in a locking position defined when the data read/write transducer heads are positioned at a predetermined landing zone position whenever airflow is insufficient to deflect said vane. A bias force providing structure, such as a return spring, between the latch and the housing biases the latch to the locking position in the absence of the vane-deflecting airflow. The disk clamp comprises centrifugal airflow pumping structure, such as radially and axially extending, generally L-shaped turboblades, for increasing the level of the vane deflecting airflow as the disk rotates.

These and other objects, aspects, advantages and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

In the Drawings:

FIG. 2 is a highly diagrammatic side view of the FIG. 1 disk drive.

FIG. 3 is an isometric view of a disk clamp with airflow generator vanes in accordance with aspects of the present invention.

DETAILED DESCRIPTION OF THE PREFERRED EMBODIMENT

Figure 1:
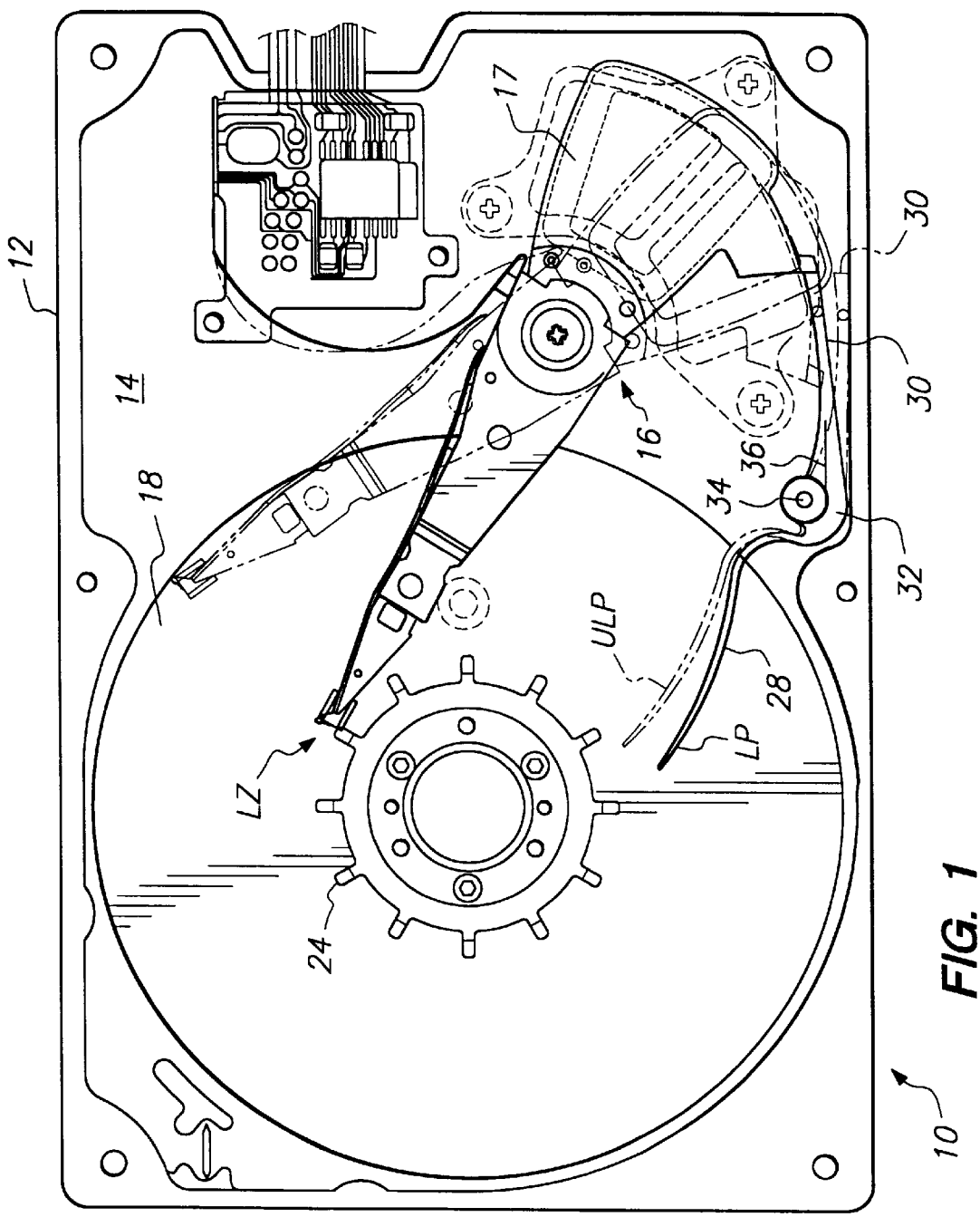
FIG. 1 is a highly diagrammatic plan view of a fixed disk drive incorporating the principles of the present invention.

With reference to FIGS. 1 and 2, a disk drive 10 includes a housing 12 preferably formed as a "deep dish" base casting of suitable material, such as aluminum alloy, and having a continuous floor and peripheral sidewalls. The housing 12 forms an interior space 14. A cover 13 mounts to the housing 12 and seals the interior space 14 via an elastomeric gasket 15 between the cover 13 and the housing 12 along the peripheral walls thereof. A mass balanced rotary actuator structure 16 is mounted to the housing 12 and supports two data transducer head assemblies as shown in FIG. 1. A flat, wedge shaped coil 17 is rotatably sandwiched in a magnetic field gap formed between at least two powerful permanent magnets in a conventional arrangement.

A single data storage disk 18 is mounted to a spindle hub assembly 20 which is rotatably journalled to the housing 12. The data storage disk 18 has a diameter of approximately 95 millimeters and defines a multiplicity of data tracks such that approximately 42 Megabytes or more of formatted user data may be stored thereon. Each data track format preferably includes embedded sectorized servo information needed for track seeking and track following by a head position servo control loop controlling electrical signals supplied to the actuator coil 17. Commonly assigned U.S. patent application Ser. No. 07/710,171 describes a preferred data track, servo sector format and sequencer architecture arrangement in a single-storage-disk miniature disk drive subsystem of the type contemplated herein, the disclosure thereof being hereby incorporated by reference.

A DC brushless spindle motor 22 coupled to the disk hub assembly 20 rotates the data storage disk 18 at a predetermined constant angular velocity, such as 3662 RPM. A disk clamp 24 in accordance with principles of the present invention clamps the disk 18 to the spindle hub assembly. The disk clamp 24 is discussed hereinafter in connection with FIG. 3.

A conventional aerodynamically released actuator latch 26 is mounted within the housing 12. The latch 26, which is integrally molded from a suitable thermoplastic material, such as Delrin™ plastic, includes an airvane segment 28 and a latch arm segment 30. The airvane segment 28 and latch arm segment 30 extend in generally opposite directions from a central body portion 32 which is rotatably journalled to a post 34 press-fit into the floor of the housing 12. A helical return bias force spring 36 is wrapped around the post 34 and applies a predetermined return bias force to the actuator to urge the latch arm segment 30 into latching engagement with the molded coil 17 of the actuator 16, so that the data transducer heads are maintained at an inner landing and takeoff zone (LZ) on the storage surface of the disk 18. The spring 36 has a nominal rate of 0.0038 gram-cm/degree. Airflow generated incident to rotation of the disk 18 by the spindle motor 22 creates a release force which is applied to the airvane portion 28 of the actuator latch 26, and when that force is sufficiently large, the latch 26 rotates from a latched position (LP) shown in FIG. 1 to an unlatched position (ULP). The release force must induce enough moment in the airvane portion 28 to overcome the return spring force.

As explained above, one drawback of the prior art was that airflow generated by rotation of a single disk was insufficient to provide a reliable, robust aerodynamically released actuator latch and a second, airflow generator disk had to be provided, as taught in the referenced Westwood U.S. Pat. No. 4,647,997. The present invention overcomes the drawback of having to provide an airflow generator disk.

With reference to FIG. 3, the disk clamp 24 is formed with a plurality of radially extending, L-shaped turboblades 40 which extend radially and axially outward from the main body of the clamp 24. The blades 40 are sized and numbered to provide increased airflow to release the actuator latch 26 without resulting in a significant increase in torque required of the spindle motor 22. The clamp 24 also includes a series of openings 42, e.g., three of which are used in conjunction with an assembly tool to align the clamp 24 with the spindle hub assembly 20 during the drive assembly process, and three of which accommodate screws 44 which secure the clamp 24 to the top of the spindle hub assembly 20 following the aligning operation.

In order to stiffen the cover 13, and to focus airflow in the vicinity of the airvane portion 28 of the latch, a depressed region 50 is defined in the cover 13. This depressed region concentrates airflow generated by rotation of the disk 18 and turboblades 40 to the space in which the airvane portion 28 is rotatably displaced thereby.

Tests were performed using a structure similar to the described in the referenced Westwood U.S. Pat. No. 4,647,997. With a second, airflow generator disk in place, the actuator latch reached a fully open state at 3000 RPM; but returned to a fully closed state when spindle motor speed was reduced to 1500 RPM. When the second, airflow generator disk was removed, the actuator latch reached a fully open state at 4100 RPM, but returned to a fully closed state when the spindle motor speed was reduced to 1700 RPM. When the clamp 24 of the present invention was installed (and without the airflow generator disk) airflow was sufficient to cause the actuator latch 26 to reach a fully open position at 2900 RPM, and return to a fully closed position when the disk speed was reduced to 1600 RPM. Measurements also showed that the additional power consumed by a 3.5" disk drive equipped with a turboblade disk clamp, such as the clamp 24, is only about 50 milliwatts. This additional power consumption has proven to be acceptable in practice and is greatly overshadowed by the reduced cost and improved simplicity achieved by the turboblade disk clamp 24.

Having thus described embodiments of the invention, it will now be appreciated that the objects of this invention have been fully achieved, and it will be understood by those skilled in the art that many changes in construction and widely varying embodiments and applications of the invention will suggest themselves without departing from the spirit and scope of the invention. The disclosures and the description herein are purely illustrative and are not intended to be in any sense limiting.

What is claimed is:

1. An aerodynamically powered release latch mechanism for a fixed disk drive including a housing and a cover for providing an enclosed interior space, a single data storage disk in the space secured by a disk clamp means to a spindle hub journalled for rotation relative to the housing by direct drive DC brushless spindle motor means, a transducer actuator assembly in the space for supporting and positioning data read/write transducer heads in close proximity to concentric data tracks defined on major storage surfaces of the disk, the latch mechanism including:

latch means in the space and journalled for rotation relative to the housing and having an axis of rotation spaced a predetermined distance away from the periphery of the data storage disk, the latch means including an airvane portion movably disposed in close proximity to one of the data storage surfaces of the disk as to be deflected by vane-deflecting airflow generated during rotation of the disk, the latch means further including releasable engagement means for engaging said transducer actuator assembly in a locking position defined when the data read/write transducer heads are positioned at a predetermined landing zone position whenever airflow is insufficient to deflect said vane, bias force providing means between said latch means and said housing for biasing the latch means to the locking position in the absence of the vane-deflecting airflow, wherein said disk clamp means further comprises a series of integrally formed radial blade projections for increasing the level of the vane deflecting airflow at the vicinity of the airvane portion, each radial blade projection comprises an L-shape having a short segment and a long segment normal thereto, wherein the short segment is generally parallel with a radius of the disk clamp, and wherein the long segment is generally normal with respect to a radius of the disk clamp, said disk clamp further comprising airflow focusing structure for concentrating increased vane deflecting airflow from the centrifugal airflow pumping means adjacent to the airvane portion.

2. The aerodynamically powered release latch mechanism set forth in claim 1 wherein said single data storage disk has a diameter less than approximately 100 millimeters.

3. An aerodynamically powered release latch mechanism for a fixed disk drive including a housing and a cover for providing an enclosed interior space, a single data storage disk having a diameter not substantially greater than approximately 100 millimeters and being secured in the space by a disk clamp to a spindle hub journalled for rotation relative to the housing by direct drive DC brushless spindle motor means, a mass-balanced rotary voice coil transducer actuator assembly in the space for supporting and positioning data read/write transducer heads in close proximity to concentric data tracks defined on major storage surfaces of the disk, the latch mechanism including a latch member in the space and journalled for rotation relative to the housing and having an axis of rotation spaced a predetermined distance away from the periphery of the data storage disk, the latch member including an airvane portion movably disposed in close proximity to a top one of the data storage surfaces of the disk as to be deflected by vane-deflecting airflow generated during rotation of the disk, the latch member further including a releasable engagement portion for engaging said transducer actuator assembly in a locking position defined when the data read/write transducer heads are positioned at a predetermined landing zone position whenever airflow is insufficient to deflect said vane, a bias force providing means acting between the latch member and the housing for biasing the latch member to the locking position in the absence of the vane-deflecting airflow, the cover includes a depression formed at a region of rotational displacement of the airvane portion for constricting an airflow path adjacent to the airvane portion and thereby concentrating the vane-deflecting airflow upon the airvane portion during disk rotation, the disk clamp comprises a series of integrally formed radial blade projections for increasing the level of the vane-deflecting airflow at the vicinity of the airvane portion during disk rotation, and the direct drive DC brushless spindle motor means consuming approximately 50 milliwatts above a power consumption thereof required to rotate the disk without the radial blade projections on the disk clamp.

4. An aerodynamically powered release latch mechanism for a fixed disk drive including a housing and a cover for providing an enclosed interior space, a single data storage disk in the space secured by a disk clamp means to a spindle hub journalled for rotation relative to the housing by direct drive DC brushless spindle motor means, a transducer actuator assembly in the space for supporting and positioning data read/write transducer heads in close proximity to concentric data tracks defined on major storage surfaces of the disk, the latch mechanism including:

latch means in the space and journalled for rotation relative to the housing and having an axis of rotation spaced a predetermined distance away from the periphery of the data storage disk, the latch means including an airvane portion movably disposed in close proximity to one of the data storage surfaces of the disk as to be deflected by vane-deflecting airflow generated during rotation of the disk, the latch means further including releasable engagement means for engaging said transducer actuator assembly in a locking position defined when the data read/write transducer heads are positioned at a predetermined landing zone position whenever airflow is insufficient to deflect said vane, bias force providing means between said latch means and said housing for biasing the latch means to the locking position in the absence of the vane-deflecting airflow, wherein said disk clamp means further comprises a generally cup-shaped member defining a top face, a peripheral flange, and an outer annular clamping surface at an outermost part of the flange for clamping the disk against the hub and further comprising at least one clamping screw for clamping the top face of the hub, said generally cup-shaped member further comprising centrifugal pumping means for increasing the level of the vane deflecting airflow at the vicinity of the airvane portion, said airflow pumping means being defined by a series of integral radial blade projections formed upon the top face and the peripheral flange, said disk clamp further comprising airflow focusing structure for concentrating increased vane deflecting airflow from the centrifugal airflow pumping means adjacent to the airvane portion.

5. An aerodynamically powered release latch mechanism for a fixed disk drive including a housing and a cover for providing an enclosed interior space, a single data storage disk in the space secured by a disk clamp means to a spindle hub journalled for rotation relative to the housing by direct drive DC brushless spindle motor means, a transducer actuator assembly in the space for supporting and positioning data read/write transducer heads in close proximity to concentric data tracks defined on major storage surfaces of the disk, the latch mechanism including:

latch means in the space and journalled for rotation relative to the housing and having an axis of rotation spaced a predetermined distance away from the periphery of the data storage disk, the latch means including an airvane portion movably disposed in close proximity to one of the data storage surfaces of the disk as to be deflected by vane-deflecting airflow generated during rotation of the disk, the latch means further including releasable engagement means for engaging said transducer actuator assembly in a locking position defined when the data read/write transducer heads are positioned at a predetermined landing zone position whenever airflow is insufficient to deflect said vane, bias force providing means between said latch means and said housing for biasing the latch means to the locking position in the absence of the vane-deflecting airflow, wherein said disk clamp means further comprises centrifugal airflow pumping means for increasing the level of the vane deflecting airflow at the vicinity of the airvane portion, and further comprising airflow focusing structure for concentrating increased vane deflecting airflow from the centrifugal airflow pumping means adjacent to the airvane portion, said airflow focusing structure being defined by a recessed region of the cover which is closely spaced away from the airvane portion in a region of rotational displacement thereof.

6. An aerodynamically powered release latch mechanism for a fixed disk drive including a housing and a cover for providing an enclosed interior space, a single data storage disk having a diameter not substantially greater than approximately 100 millimeters and being secured in the space by a disk clamp to a spindle hub journalled for rotation relative to the housing by direct drive DC brushless spindle motor means, a mass-balanced rotary voice coil transducer actuator assembly in the space for supporting and positioning data read/write transducer heads in close proximity to concentric data tracks defined on major storage surfaces of the disk, the latch mechanism including a latch member in the space and journalled for rotation relative to the housing and having an axis of rotation spaced a predetermined distance away from the periphery of the data storage disk, the latch member including an airvane portion movably disposed in close proximity to a top one of the data storage surfaces of the disk as to be deflected by vane-deflecting airflow generated during rotation of the disk, the latch member further including a releasable engagement portion for engaging said transducer actuator assembly in a locking position defined when the data read/write transducer heads are positioned at a predetermined landing zone position whenever airflow is insufficient to deflect said vane, a bias force providing means acting between the latch member and the housing for biasing the latch member to the locking position in the absence of the vane-deflecting airflow, the disk clamp comprises a series of integrally formed radial blade projections for increasing the level of the vane-deflecting airflow at the vicinity of the airvane portion during disk rotation, each radial blade projection comprising an L-shape having a short segment and a long segment normal thereto, and wherein the short segment is generally parallel with a radius of the disk clamp, and wherein the long segment is generally normal with respect to a radius of the disk clamp, and the direct drive DC brushless spindle motor means consuming approximately 50 milliwatts above a power consumption thereof required to rotate the disk without the radial blade projections on the disk clamp.

* * * * *